United States Patent [19]
Mori

[11] Patent Number: 5,185,717
[45] Date of Patent: Feb. 9, 1993

[54] TAMPER RESISTANT MODULE HAVING LOGICAL ELEMENTS ARRANGED IN MULTIPLE LAYERS ON THE OUTER SURFACE OF A SUBSTRATE TO PROTECT STORED INFORMATION

[76] Inventor: Ryoichi Mori, 24-12, Hakusan 1-chome, Bunkyo-ku, Tokyo, Japan

[21] Appl. No.: 845,767

[22] Filed: Mar. 2, 1992

Related U.S. Application Data

[63] Continuation of Ser. No. 387,845, Jul. 31, 1989, abandoned.

[30] Foreign Application Priority Data

Aug. 5, 1988 [JP] Japan ................. 63-195847

[51] Int. Cl.⁵ .................. G11C 5/00; G06F 12/16
[52] U.S. Cl. .................. 365/52; 364/DIG. 2; 364/969.3; 364/970.4; 365/63
[58] Field of Search .................. 395/725, 425, 800; 380/4; 365/52, 63, 189.01

[56] References Cited

U.S. PATENT DOCUMENTS

| | | | |
|---|---|---|---|
| 4,278,837 | 7/1981 | Best | 178/22.09 |
| 4,612,623 | 9/1986 | Bazarnik | 364/569 |
| 4,691,350 | 9/1987 | Kleijne et al. | 380/3 |
| 4,783,801 | 11/1988 | Kaule | 380/3 |
| 4,807,284 | 2/1989 | Kleijne | 380/3 |
| 4,811,288 | 3/1989 | Kleijne | 365/52 |
| 4,932,053 | 6/1990 | Fruhauf et al. | 380/4 |
| 4,933,898 | 6/1990 | Gilberg et al. | 365/53 |
| 4,941,175 | 7/1990 | Enescu et al. | 380/4 |

OTHER PUBLICATIONS

David Chaum; "Design Concepts for Tamper Responding System" in Advances In Cryptology, Proceeding of Crypto '83, Plenum Press 1984, pp. 387-392.
"Physical Security for the μABYSS System" by Steve H. Weingart Proceedings 1987 IEEE Symposium on Security and Privacy, Apr. 27-29, 1987, pp. 52-58.
The VLSI Designer's Library, by John Newkirk et al. published by Addison-Wesley Publishing Co., Inc. 1983 pp. 96 to 98.

*Primary Examiner*—Lawrence E. Anderson
*Assistant Examiner*—Krisna Lim
*Attorney, Agent, or Firm*—W. G. Fasse; D. H. Kane, Jr.

[57] ABSTRACT

The reliability of a tamper resistant module for safeguarding stored information, e.g. in an electronic computer system, is improved to deny access to the system by an unauthorized person or at least to a specific portion of the system. For this purpose, the module has for example a pair of substrates which are bonded together to confine confidential data inside the module. On the outer surfaces of the substrates, a plurality of logical elements, such as transistors, form detecting memory devices. The plurality of these detecting memory devices are operative under a normal condition, but at least one of these detecting memory devices is rendered inoperative when a tampering is applied to the outer surface of the substrate. In a tamper free normal situation all memory devices work properly. The inoperability of any of the detecting memory devices is detected when tampering occurs. When the tamper is detected, the confidential data confined within the module are erased.

7 Claims, 7 Drawing Sheets

TAMPER RESISTANT MODULE HAVING LOGICAL ELEMENTS ARRANGED IN MULTIPLE LAYERS ON THE OUTER SURFACE OF A SUBSTRATE TO PROTECT STORED INFORMATION

This application is a continuation of application Ser. No. 07/387,845, filed on Jul. 31, 1989, now abandoned.

FIELD OF THE INVENTION

The present invention relates to a tamper resistant module for safeguarding stored information by resisting against any attempt to decode confidential data stored in the module.

BACKGROUND INFORMATION

In order to make the security of an electronic computer system reliable, a mechanism is needed which does not permit an unauthorized person to physically access a specific portion of the computer system. Particularly, such a mechanism is needed to prohibit any unauthorized person from making a copy of the contents contained in a certain location of the system or from altering codes contained therein. To this end, a confidential portion of the system is confined within a module to preserve the confidentiality of the system. In case there is an attempt to tamper with the module to decode the confidential data stored therein, e.g. when an attempt is made to bore a hole in the module, it is conventional to defend against the attempt by erasing the confidential data in response to the boring.

A tamper resistant module, as mentioned above is disclosed in "Physical Security for the μ ABYSS System" by Steve H. Weingart of IBM Thomas J. Watson Research Center, Proceedings, 1987 IEEE Symposium on Security and Privacy, Oakland, Calif. Apr. 27-29, 1987, p.p. 55-58. In the known module, a thin wire such as a nichrome wire is wound about the module which holds the confidential data therein. In case that the wire is cut, short-circuited, or the connection of the wire is changed, such tampering with the module is detected from the change in resistance of the wire, in response to which the confidential data is erased.

However, winding of the wire on the module is not suitable for mass production. Further, the resistance of the wire changes due to aging, or in accordance with a change in temperature, or due to other ambient changes. Thus, notwithstanding the fact that an attempt to tamper is not occurring, the confidential data can be erroneously erased. Furthermore, despite the fact that an attempt to tamper is occurring, such an attempt may not be detected with the result that the module fails to erase the confidential data contained in the module.

SUMMARY OF THE INVENTION

In view of the foregoing it is an object of the invention to provide a tamper resistant module for safeguarding stored information, which module is suitable for mass production and which does not erroneously erase confidential data contained in the tamper resistant module as a result of an erroneous detection of a tampering attempt when in fact there was no tampering attempt.

In order to achieve the foregoing and other objects, there is provided a tamper resistant module for safeguarding stored information comprising a substrate having an inner surface and an outer surface, confidential data being confined to the inner surface of the substrate, a plurality of logical elements arranged on the outer surface of the substrate, the plurality of logical elements being operative under a normal condition, at least one of the plurality of logical elements being rendered inoperative when a tamper is applied to the outer surface of the substrate, and detecting means for detecting operability of the plurality of logical elements to thus detect the tamper applied to the outer surface of the substrate. The logical elements are arranged in multiple layers.

In order that an unauthorized person may not succeed in decoding the confidential data confined in the module, the confidential data is erased when the detecting means detects the tamper applied to the outer surface of the substrate.

The logical elements can be memory devices, such as RAMs, which are arranged on the outer surface of the substrate. Therefore, it is possible to mass produce the modules and to exclude erroneous detection of a tamper.

BRIEF DESCRIPTION OF THE DRAWINGS

The present invention will be described by way of non-limitative embodiments, in which.

DESCRIPTION OF THE PREFERRED EMBODIMENTS

Figure 1:
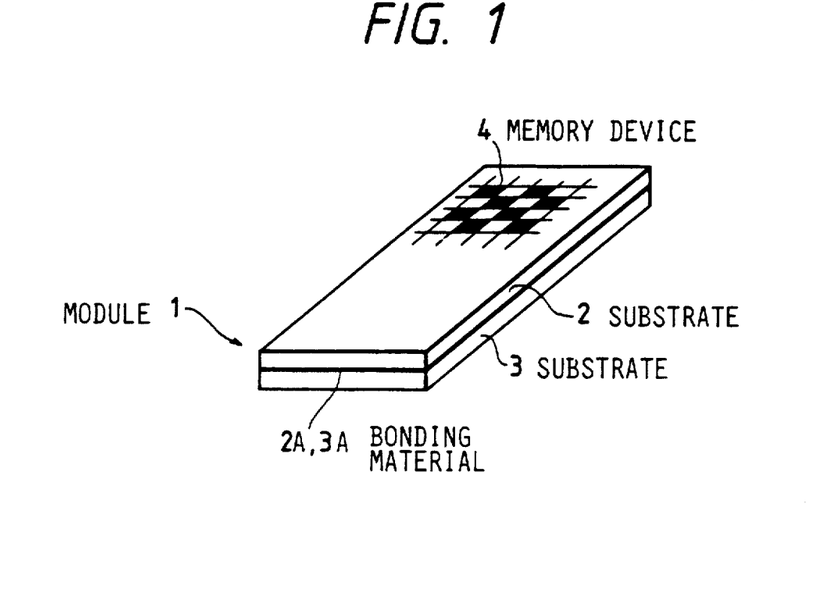
FIG. 1 is a perspective view showing a tamper resistant module according to one embodiment of the present invention.
Figure 2:
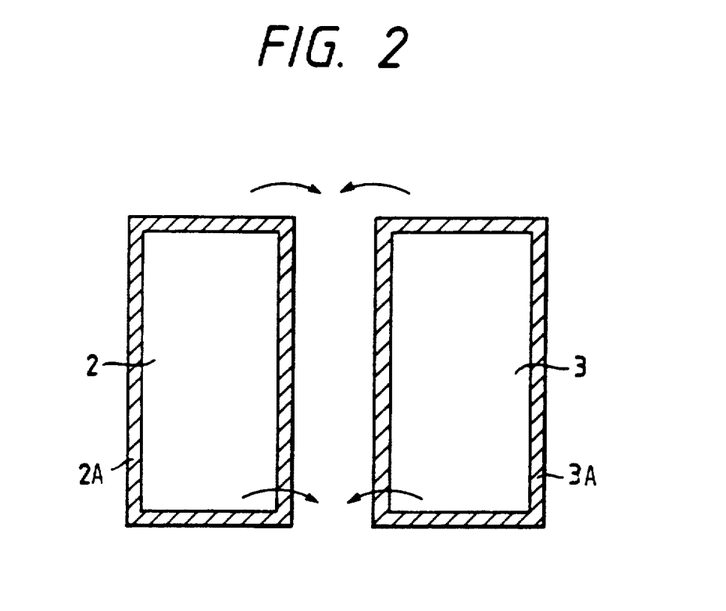
FIG. 2 is a plan view showing a tamper resistant module according to another embodiment of the present invention.

FIG. 1 is a perspective view showing a tamper resistant module 1 according to a first embodiment of the present invention, and FIG. 2 is an exploded perspective view showing the tamper resistant module of FIG. 1. Throughout the specification, the term "tamper" or "tampering" will be used to refer to an act attempting to decode confidential data contained in a memory by a mechanical force, a temperature change, by chemicals, any biochemical measure, or by a laser beam, etc.

As shown in FIG. 1, the tamper resistant module 1 comprises a pair of substrates 2, 3. The substrates 2, 3 have inner surfaces bonded together along peripheral regions forming bonding areas 2A, 3A as indicated by oblique hatching lines in FIG. 2. Memory devices 4 are present even beneath the bonding areas 2A, 3A. Two substrates 2, 3 are bonded together by directly applying a bonding material to the memory devices 4 or by an adhesive piece fixedly attached to the memory devices 4. The determination of the size of the bonding area and the selection of the bonding material are made so that the bonding strength holding the substrates 2, 3 together is larger than a strength of the respective layers of a transistor 8, to be described later with reference to FIG. 6, against a separation force. The memory devices 4 store safeguard information as is described in more detail below with reference to FIG. 20.

The tamper resistant module 1 thus fabricated can be made very thin and has an accurate ability to detect a tampering with the module from the horizontal direction as well as a tampering from the vertical direction. Even for a thick tamper resistant module of the invention, the tamper detecting accuracy in the horizontal direction can be maintained at a level similar to that in the vertical direction by depositing or arranging the memory devices on the side surface of the module.

Confidential data are stored in the confidential circuit 14 of FIG. 20, to be described below, inside of the bonding areas 2A, 3A. A bonding or adhesive material is coated on the peripheral portion of one of the substrates 2, 3, as mentioned. It is to be noted that the tamper resistant module 1 has a rectangular shape having a side dimension ranging from less than one millimeter to several centimeters. The size of the module can freely be determined although there is a minimum limitation attendant to the size of the memory device 4.

Figure 3A:
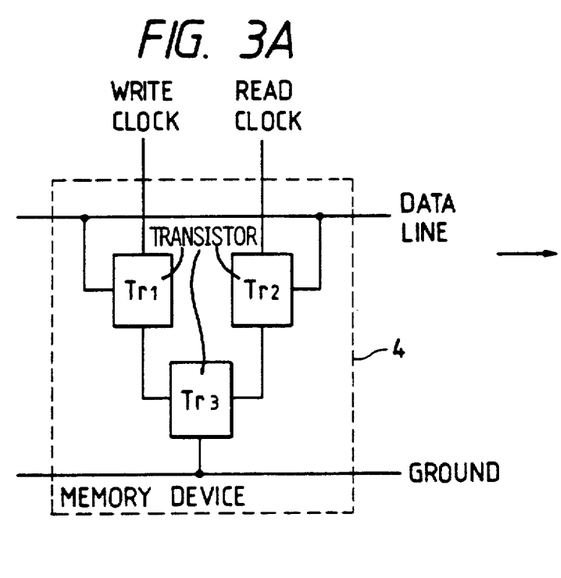
FIG. 3A and 3B is a block diagram showing a connection of transistors constituting a memory device provided in the tamper resistant module according to the embodiment of the present invention.
Figure 3B:
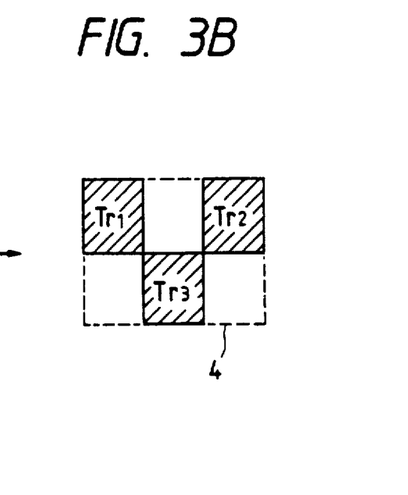

In the upper surface of the upper substrate 2 and of the lower surface of the lower substrate 3, the memory device 4 as shown in FIG. 3 is deposited by a vapor phase method or the like. The memory device 4 shown in FIG. 3 is a dynamic memory including three transistors Tr1, Tr2 and Tr3. Such a memory is disclosed in "The designer's Library" by J. Newkirk and R. Mathews, Addison-Wisley, 1983. The memory device 4 need not necessarily be of a dynamic type but a static type memory may be used. A plurality of memory devices 4 are arranged in line on the surfaces of the substrates 2, 3. Each memory device 4 has a write clock terminal, a read clock terminal, a data terminal, and a ground terminal. These terminals are interconnected among the plurality of memory devices. In FIG. 1 only a portion of the plurality of the memory devices is depicted on an enlarged scale. The size of each of the transistors Tr1, Tr2 and Tr3 is several ten microns. In order to simplify the illustration of the memory device 4 as in FIG. 3A, it will be depicted in a manner as shown in FIG. 3B.

Figure 4A:
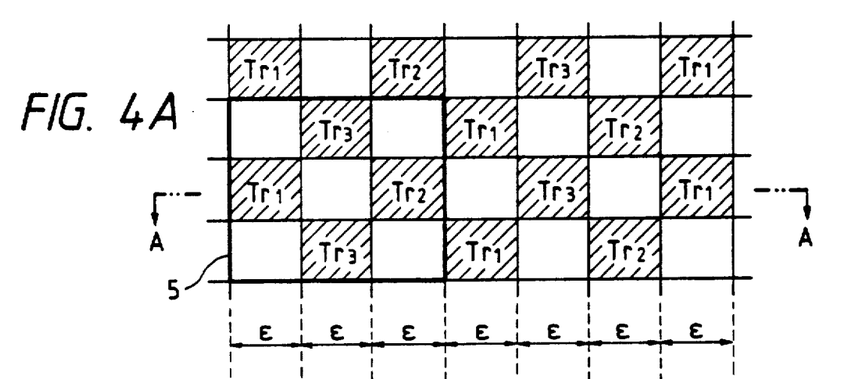
FIGS. 4A and 4B are a plan view and a cross-sectional view cut along a line A—A in FIG. 4A showing, respectively, a tamper resistant module according to still another embodiment of the tamper resistant module of the present invention.
Figure 4B:
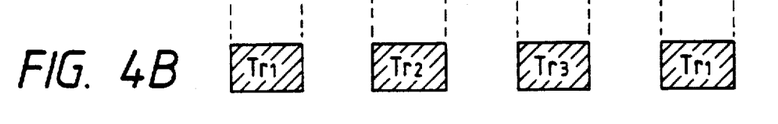
Figure 5A:
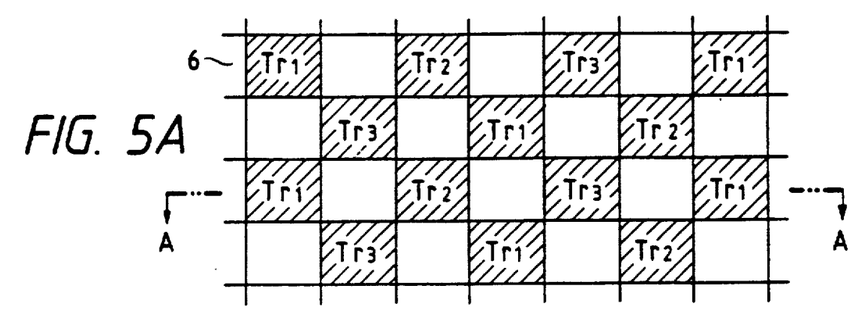
FIGS. 5A and 5B are plan views and FIGS. 5C and 5D are cross-sectional views cut along lines A—A and B—B in FIGS. 5A and 5B, showing a tamper resistant module according to yet another embodiment of the present invention.
Figure 5B:
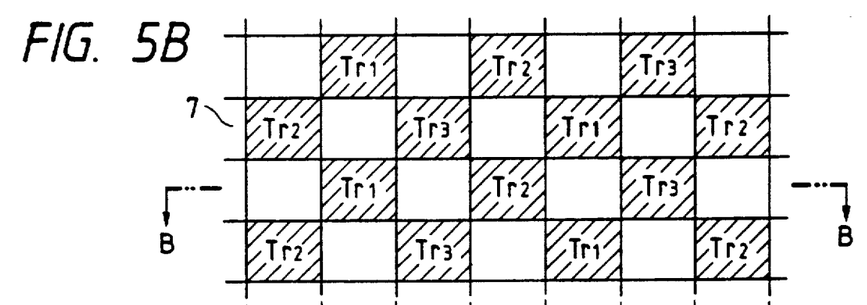
Figure 5C:
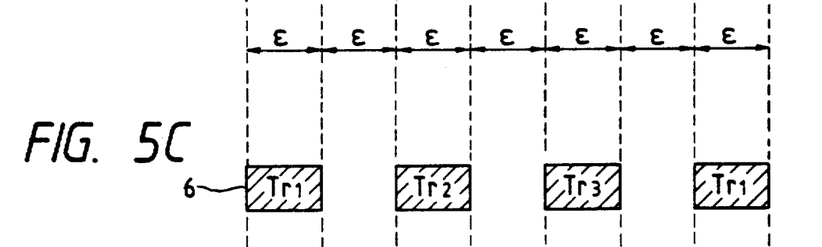
Figure 5D:
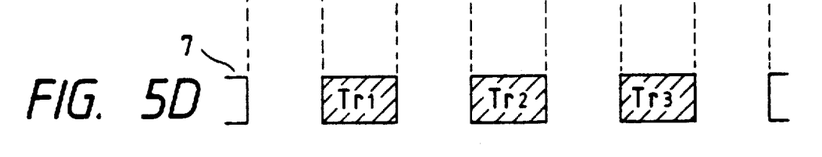

The memory devices 4 are arranged on the surfaces of the substrates 2, 3 as shown in FIG. 4 or 5. Specifically, the transistors Tr1, Tr2 and Tr3 are arranged in staggered or checkerboard fashion. The cross-section of the memory device 4 along section line A—A in FIG. 4A, is as shown in FIG. 4B.

Should one or more than one of the transistors Tr1, Tr2 and Tr3 be tampered with, the memory device 4 loses its function. With a circuit shown in FIG. 20, to be described below, the contents of the detecting memory device 4 are written in and then immediately read out in repetitive manner to cover all the detecting memory devices of the module to thereby detect any tampered memory device. When a tampered memory is detected, the confidential data stored in the confidential circuit 14 are erased presuming that the detecting memory device has been tampered with.

It should be noted that there are two different groups of RAM cells in a tamper-resistant module. Confidential circuit 14, which is confined within an inner surface of the module, contains the memory proper. The memory device 4, which occupies the outer surface of the module, is the tamper detecting memory device. Using separate memory devices for an independent tamper-detecting circuit as described, provides a better detection and a better analysis of errors, whatever their cause, than could be obtained by using the same memory capacity for a conventional redundancy checking. The reason is as follows.

It is possible to precisely control the timing relation between reading and writing for a detecting memory device, as well as generally checking the history of the device. This device history is independent of the reading and writing history of the bits to be protected and stored in the confidential circuit 14. The detecting memory device can be tested by writing into it and reading from it with any desired intervals between successive actions.

In conventional memory organizations where redundancy is used for an error detection and analysis, these timing relations and histories are not known because they depend on the behavior of the application program that is using the memory. When examining a particular bit in a conventional memory, one does not know for certain when it was last written nor whether it was written with a "one" or a "zero". The redundancy bits provide only a probability guess as to what the correct state is and no information at all about when the last state transition took place.

If an error is found when testing a detecting memory device, according to the invention, the testing interval can be adjusted so as to determine the likely nature of the error: such as soft (transient), hard (permanent but accidental), or malicious (caused by a tamper with the device). The following three situations are discerned.

(1) If the error does not persist after repeated write-read cycles with short intervals, we assume that it is a soft error.

(2) If the error does not appear to be a soft error, we check the cells physically adjacent to the one that manifested the error. If the fraction of adjacent cells that are in error is less than some threshold, we assume that the error is a hard error.

(3) If the error is neither a soft error nor a hard error, we assume that it is caused by a tampering attempt. The correct response in this third case is to erase the confidential data in the inner surface.

In the example shown in FIG. 4, the detecting memory device 4 is pessimistically assumed to be operative even if a part of each of the transistors Tr1, Tr2 and Tr3 is lost. Even so, a tampering attempt can be detected if a portion ($3\epsilon \times 3\epsilon$ in size) surrounded by a thick solid line 5, see FIG. 4A, is lost where $\epsilon$ is the size of each transistor.

In the example shown in FIG. 5, a first layer 6 is superposed on a second layer 7. Specifically, the first and second layers 6 and 7 are superposed so that the cross-section of FIG. 5A, cut along a line A—A, is as shown in FIG. 5C, while the cross-section of FIG. 5B, cut along line B—B, is as shown in FIG. 5D. The transistors in the first layer 6 and in the second layer 7 are so arranged that the transistors in one layer fill the blank spaces in the other layer and vice versa. Therefore, a tampering attempt can be detected when an opening of about $2\epsilon \times 2\epsilon$ is formed when the first layer 6 and the second layer 7 are exposed to a tampering attempt.

Based upon this theory, if the detecting memory device 4 is fabricated with a multiplicity of layers, the diameter of a detectable hole can be reduced to $\epsilon$ at a minimum. Further, the detecting ability of the detecting memory device 4 can be improved by adjusting the sensitivity of the tamper detection by ANDing or ORing the relevant layers 6, 7, whereby it becomes possible to avoid an erroneous detection of a temporary or permanent malfunction of the memory device 4 which malfunction does not actually exist. Further, it is possible to avoid an erroneous detection of a tampering when none exists, by the provision of the memory device 4 in part of the outer surface of the substrate depending upon the portion where the confidential data is present.

Figure 6A:
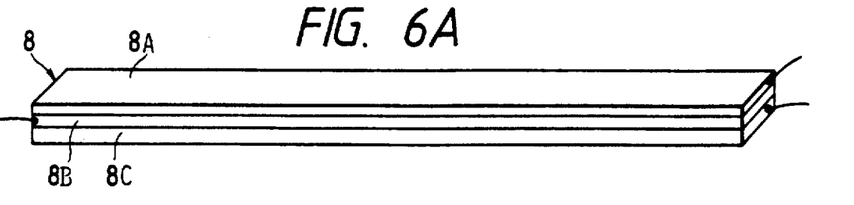
FIGS. 6A, 6B and 6C is a perspective view showing a tamper resistant module according to a further embodiment of the present invention.

FIGS. 1 to 5, have been described with reference to the memory device 4 in which a number of square-shaped MOS transistors Tr1, T42, Tr3 are arranged. However, transistors having an elongated shape are also available. Such an example is shown in FIG. 6 in which one side of the MOS transistor 8 is elongated. In FIG. 6A, the transistor 8 is fabricated with three layers namely a source layer 8A, a gate layer 8B, and a drain layer 8C. Lead wires of the source layer 8A and of the drain layer 8C extend to the right and the lead wire of the gate layer 8B extends to the left. The transistor 8 is deposited on the upper surface of the substrate 2 and the lower surface of the substrate 3 (see FIG. 1) by a vapor phase method or the like. Either the source layer 8A or the drain layer 8C may be arranged externally of the tamper resistant module 1.

Figure 6B:
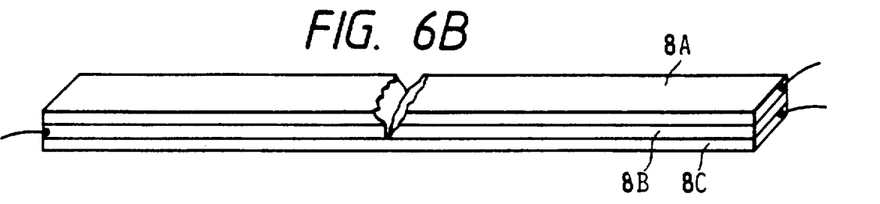
Figure 6C:
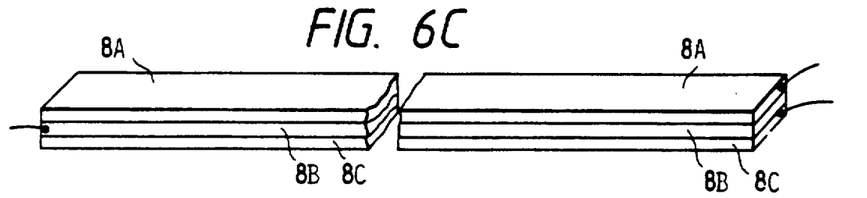

In the examples shown in FIGS. 6B and 6C, the source layer 8A is arranged externally of the tamper resistant module 1. The example shown in FIG. 6B shows the case where the source layer 8A and the gate layer 8B are subjected to a mechanical tampering attempt. If the two layers of the transistor 8 are separated as shown by the tampering, the transistor 8 loses its function, whereby the inoperative memory device including such a transistor 8, is detected, the confidential data contained in the confidential circuit 14 is erased on the presumption that the detecting memory device 4 has been tampered with.

Figure 7:
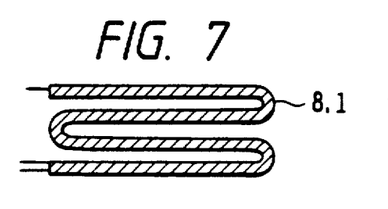
FIG. 7 is a plan view showing a tamper resistant module according to still a further embodiment of the present invention.

While FIG. 6 shows a linearly shaped transistor 8, FIG. 7 shows a transistor 8.1 folded in a zig-zag form. The lead wires of the source layer 8A and of the drain layer 8C extend to the left lower side and the lead wire of the gate layer 8B extends to the right upper side in FIG. 7. The transistor 8.1 is deposited on the upper surface of the substrate 2 and on the lower surface of the substrate 2 (see FIG. 1) by a vapor phase method. Each transistor 8.1 shown in FIG. 7 has a large area so that the number of the transistors arranged in the substrate 2 or 3 can be reduced.

Figure 8:
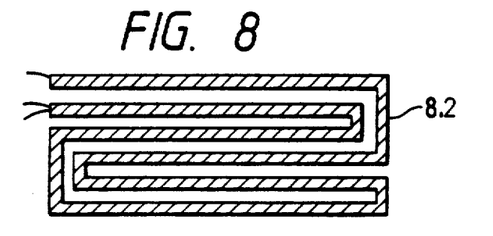
FIG. 8 is a plan view showing a tamper resistant module according to a yet further embodiment of the present invention.

FIG. 8 is a modification of the embodiment shown in FIG. 7. The lead wires of the source layer 8A, the gate layer 8B, and of the drain layer 8C of the transistor 8.2 extend from the upper left side of the device shown in FIG. 8, thereby facilitating the wiring. In addition, the embodiment shown in FIG. 8 is formed as a bifilar winding so that induction signals induced in forward and backward paths cancel each other out and thus a noise margin can be set high.

Figure 9:
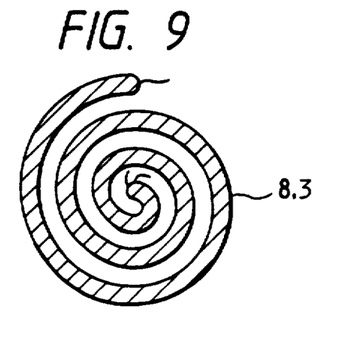
FIG. 9 is a plan view showing a tamper resistant module according to another embodiment of the present invention.

While FIG. 6 shows the embodiment in which the transistor 8 is in a linear shape, FIG. 9 shows an embodiment in which the transistor 8.3 has a spiral configuration. The lead wires of the source layer 8A and of the drain layer 8C extend from the center portion and the lead wire of the gate layer 8B extends from the outer circumferential portion. Each transistor 8.3 shown in FIG. 9 has a large area so that the number of the transistors arranged in the substrate 2 or 3 can be reduced.

Figure 10:
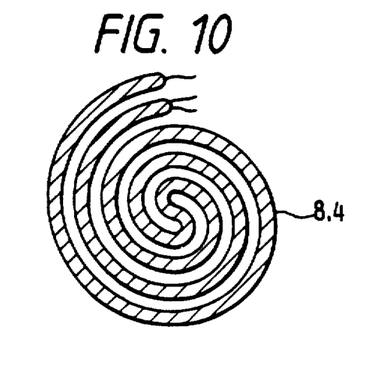
FIG. 10 is a plan view showing a tamper resistant module according to a further embodiment of the present invention.

FIG. 10 is a modification of the embodiment shown in FIG. 9. The lead wires of the source layer 8A, the gate layer 8B and of the drain layer 8C extend from the outer circumferential portion of the transistor 8.4, thereby facilitating the wiring. In addition, the embodiment shown in FIG. 10 also forms a bifilar winding so that induction signals induced in forward and backward paths cancel each other out and thus the noise margin can be set high.

Figure 11:
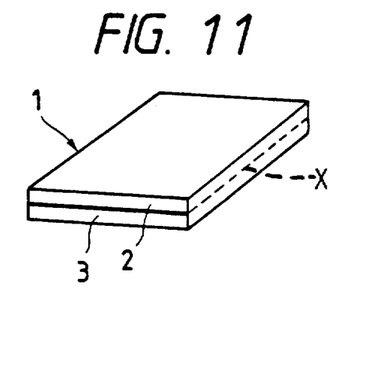
FIG. 11 is a perspective view showing a tamper resistant module according to a still further embodiment of the present invention.

FIG. 11 is a perspective view showing a modification of the tamper resistant module shown in FIG. 1. In FIG. 11, the same reference numerals are used as in FIG. 1 to designate the same components to avoid a duplicate description.

Figure 12:
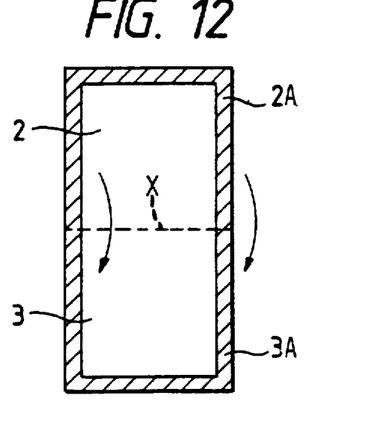
FIG. 12 is a plan view showing a tamper resistant module according to yet a further embodiment of the present invention.

In the tamper resistant module 11 shown in FIG. 11, the substrates 2 and 3 are formed with a single elongated substrate as shown in FIG. 12. Bonding of the substrates 2 and 3 is achieved by folding the elongated substrate along a dotted line X. The determination of the size of the bonding area and the selection of the bonding material are made so that the bonding strength of the substrates 2, 3 is larger than a strength of the respective layers of a transistor 8 as described above.

When the elongated substrate is folded to bond the substrates 2, 3 together, the strength of the folded portion is differentiated from that of the bonded portion.

Figure 13:
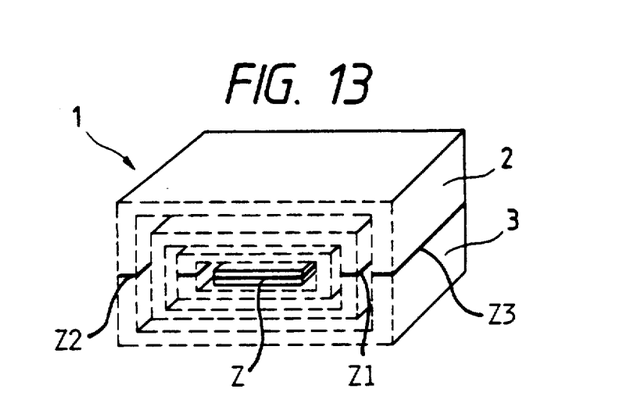
FIG. 13 is a perspective view showing a tamper resistant module according to a further embodiment of the present invention.

FIG. 13 is a modification of the embodiment of FIG. 12 in which four layers are superposed and are folded together to make the strengths in the folded portion and the bonded portions substantially even. In this modification, the folded areas are located in different positions. Specifically, the folded area Z of the first combination of the innermost substrates 2 and 3 is located in an upper position relative to an imaginary plane passing centrally and horizontally through FIG. 13. The folded area Z1 of the second combination of the substrates 2 and 3 is located in the rightward direction. The folded area Z2 of the third combination of the substrates 2 and 3 is located in the leftward direction, and the folded area Z3 of the fourth combination of the outermost substrates 2 and 3 is located in a lower position, or rather below said imaginary plane. In this manner, the positions in which the folded areas are located out of alignment relative to each other whereby the strengths of the module against any mechanical tampering efforts directed from the upper, lower, right and left directions can be made substantially even. Stated differently, the present module is equally tamper proof against tampering efforts from all directions.

Figure 14:
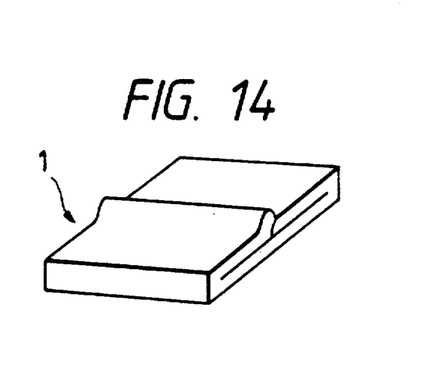
FIG. 14 is a perspective view showing a tamper resistant module according to still a further embodiment of the present invention.
Figure 15:
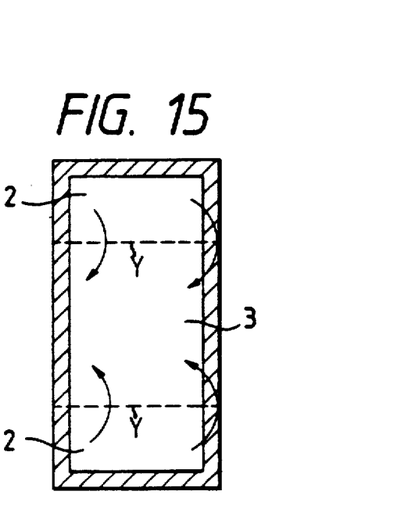
FIG. 15 is a plan view showing a tamper resistant module according to yet a further embodiment of the present invention.

FIG. 14 is a further modification of the tamper resistant module shown in FIG. 1. In FIG. 14, the same reference numerals as those used in FIG. 1 or FIGS. 11 to 13 designate the same components. The tamper resistant module of FIG. 14 is formed with a single elongated substrate as shown in FIG. 15. The elongated substrate is folded along dotted lines Y in the directions as indicated in FIG. 15 so as to partially overlap the end portions of the substrate as shown in FIG. 14.

Figure 16:
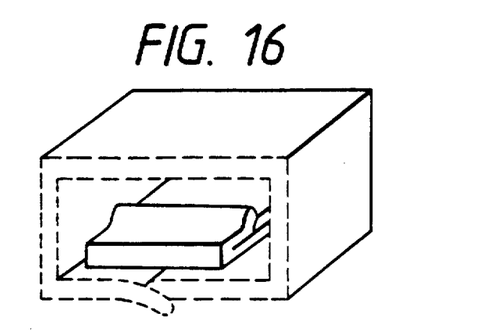
FIG. 16 is a perspective view showing a tamper resistant module according to a further embodiment of the present invention.

In the case where the tamper resistant module 1 is made in a manner as described, the strength in the central overlapped portion differs from that in the remaining portion. In the embodiment shown in FIG. 16, one combination of the substrates 2, 3 is arranged to wrap another combination of the substrates 2, 3, so that overlapped zones of the substrates 2, 3 intersect with each other. Specifically, the inner combination of the substrates 2, 3 is disposed so that its overlapped portion is oriented in a first direction and the outer combination of the substrates 2, 3 is disposed so that its overlapped zone is oriented in a second direction orthogonal to the first direction. Since the overlapped zones of the inner and outer combinations of the substrates 2, 3 intersect with each other, the strength of the tamper resistant module 1 can be made substantially even against any tampering attempt applied from the first and second directions.

Figure 17:
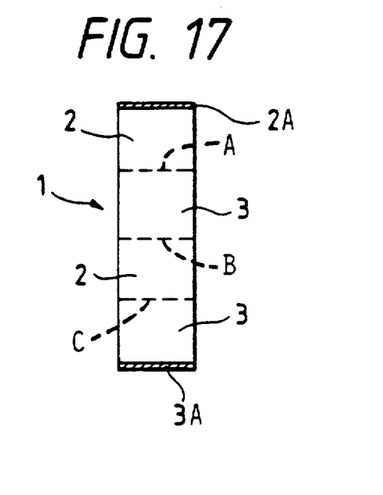
FIG. 17 is a plan view showing a tamper resistant module according to still a further embodiment of the present invention.
Figure 18:
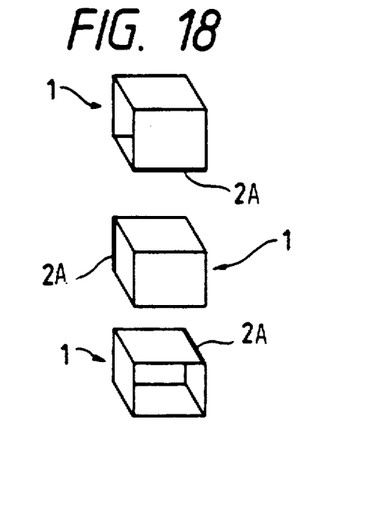
FIG. 18 is a perspective view showing a tamper resistant module according to yet a further embodiment of the present invention.
Figure 19:
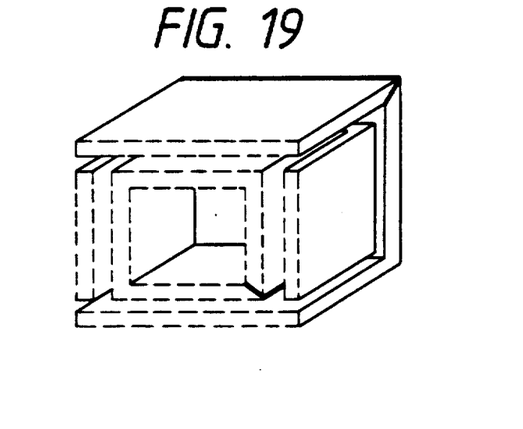
FIG. 19 is a perspective view showing a tamper resistant module according to a still further embodiment of the present invention.

FIGS. 17 to 19 are perspective views showing other modifications of the tamper resistant module shown in FIG. 1. In FIGS. 17 to 19, the same reference numerals as those in FIGS. 11 to 16 designate the same components.

In the tamper resistant module of FIG. 17, the substrates 2, 3 are formed by a single rectangular substrate. The rectangular substrate is folded inwardly along the dotted lines A, B, C, whereupon the bonding areas 2A, 3A are bonded together.

In the embodiment shown in FIG. 18, three tamper resistant modules are combined together, in which the positions of the bonding zones are different from one another as shown in FIG. 19. These three tamper resistant modules are combined to form a cubic box configuration, thereby allowing confidential data to be disposed inside the cubic box.

Figure 20:
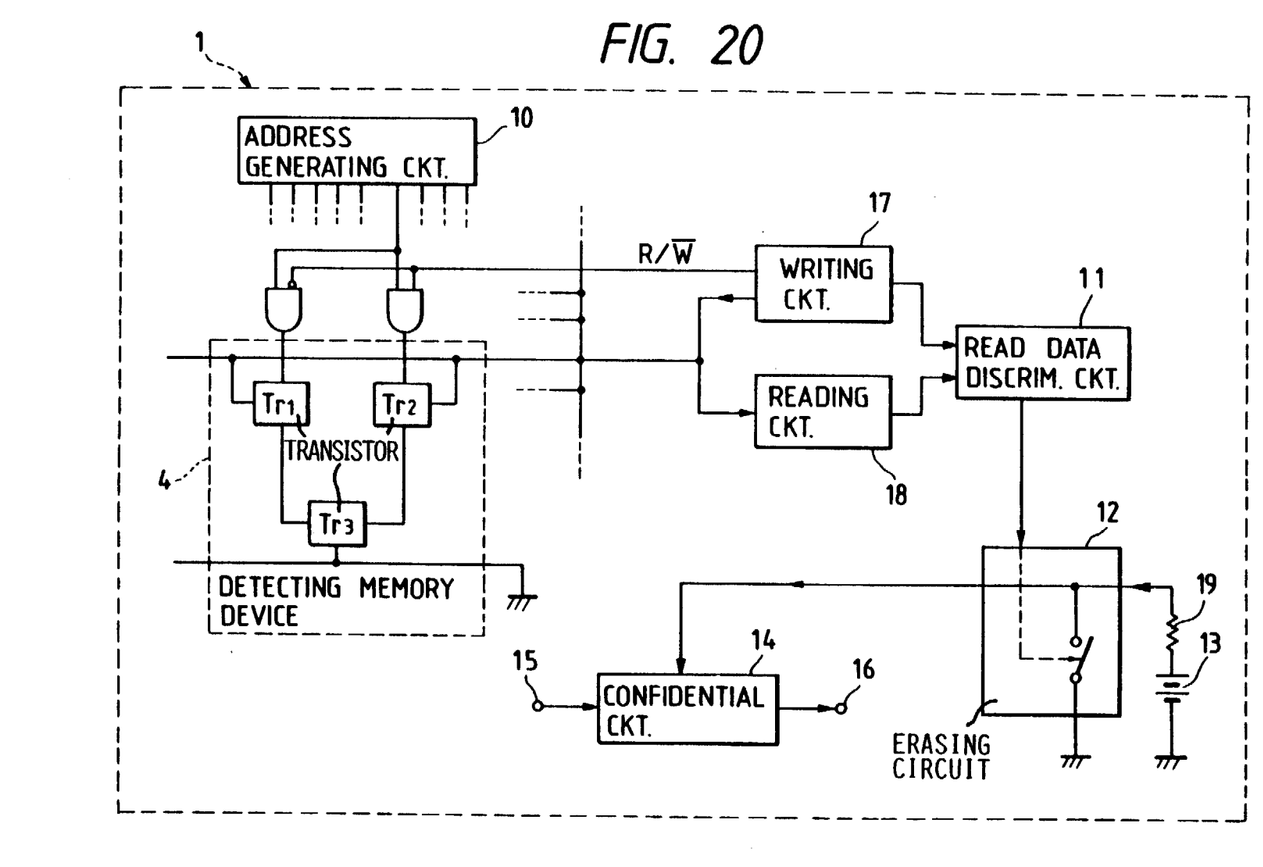
FIG. 20 is a block diagram showing a tamper resistant module according to the embodiment of the present invention.

FIG. 20 is a block diagram showing a circuit for erasing confidential data which is rendered operative when a tampering attempt is detected. The confidential data have been written in a confidential circuit 14 which is constructed with a random access memory (RAM). Disposed inside of the tamper resistant module are an address generating circuit 10 for storing safeguard information in the memory devices 4, a read data discriminating circuit 11, a confidential data erasing circuit 12, a writing circuit 17, and a reading circuit 18 together with the confidential circuit 14. The memory devices 4 are disposed outside of the tamper resistant module 1. A power supply 13 may be provided either inside of the tamper resistant module 1 or outside thereof if a backup is provided or an instantaneous interruption of the power supply can be appropriately dealt with.

The circuit diagram shown in FIG. 20 provided for the memory device 4, which is made of a dynamic RAM 4, operates as follows. To the memory device 4, an address signal is supplied from the address generating circuit 10. The writing circuit 17 writes bits indicative of a random value or a predetermined value in the memory device 4 designated by the address. The address generating circuit 10 is constructed, for example, with a counter, which performs an addressing operation for all the memory devices 4. The content of the memory device 4 is immediately read out by the reading circuit 18. Since the memory device 4 is constructed with a dynamic RAM, no refreshing operation is required.

The data written in the memory device 4 and the data read out of the memory device 4 are fed to the read data discriminating or comparing circuit 11. The latter circuit 11 is constituted, for example, with an exclusive logic OR circuit and checks whether or not the data written into the memory device 4 coincide with the data read out of the memory device 4. Upon inverting the value written in the memory device 4, i.e. inverting "0" and "1", the discriminating circuit 11 again checks whether or not the data written in the memory device 4 coincide with the data read out of the memory device 4. By the implementation of such checkings, functions imposed on all the transistors Tr1, Tr2, Tr3, constituting the memory device 4 can be perfectly examined. The result of the examination is supplied to the confidential data erasing circuit 12.

The confidential data erasing circuit 12 comprises, for example, an analog switch which allows the power supply 13 to connect ground through a resistor 19. The circuit 12 is normally in an open state. Due to the open state of the circuit 12, the power is supplied to the confidential circuit 14 to hold the confidential data stored therein. The confidential data are written into the confidential circuit 14 through an input terminal 15 and are read out thereof from an output terminal 16. The read out of confidential data is used only within the tamper resistant module 1. In the event that there is a tampering attempt against the damper resistant module 1, either of the transistors Tr1, Tr2, Tr3 is damaged with the result that the memory 4 loses its function and the data written therein cannot be properly outputted, that is, there will be an inconsistency or non-coincidence between the written-in and read-out contents.

If such a non-coincidence exists between the written-in and read-out contents, the read data discriminating circuit 11 detects the inconsistency and switches the confidential data erasing circuit ON, whereby power normally supplied to the confidential circuit 14 is interrupted and hence the contents stored therein is erased.

It is not necessary that the power supply 13 and power supplies to the memory devices 4, address generating circuit 10, read data discriminating circuit 11, confidential data erasing circuit 12, writing circuit 17 and the reading circuit 18 are batteries contained in the tamper resistant module 1. Rather, the power supply may be a combination of a commercial power supply and an external or internal backup battery for use in case of an interruption of the commercial power supply. In the case where the power supply battery is externally provided, an external or internal large capacitor may be provided to compensate for an instantaneous interruption of the external commercial power supply.

In the event that the power supply should be interrupted, that is, in the case where the backup battery has been removed or has been used up and the external commercial power supply has been interrupted for a long period of time, the protection of the confidential data in the confidential circuit 14 can still be accomplished if the operating voltages and the time constant have been set so that the turn off of the power supply to the memory devices 4, address generating circuit 10, read data discriminating circuit 11, confidential circuit 12, writing circuit 17 and reading circuit 18 occurs after the turn off of the power supply to the confidential circuit 14. Because, insofar as the storing contents (confidential data) exist in the confidential circuit 14, the tamper detecting function and the confidential data erasing function remain in force.

Under an extremely low temperature, the storing of the confidential data is sometimes maintained in the confidential circuit 14 without need for a power supply. The tamper resistant module is required to protect the confidential data against a tampering attempt by exposing the module to these low temperatures. Since the period of time during which the temperature of the module shifts from the normal operating temperature to the extremely low temperature is sufficiently long, such a temperature tampering can be detected during this period of time, whereupon the storing content in the confidential circuit 14 is erased.

The circuit shown in FIG. 20 can be modified in a variety of ways. For example, the memory device 4 need not be a dynamic RAM but be a read-only memory (ROM) or an erasable programmable read-only memory (EPROM). If the memory device 4 comprises a ROM or an EPROM, all or part of the writing circuit can be dispensed with.

A time required to cyclically examine all the detecting memory devices 4 must be shorter than a time required to access the confidential data starting with the begin of a tampering effort. The latter time is in the order of several seconds. Therefore, the time for examining all the memory devices 4 is allowed to be slower than, for example, a refreshing cycle of a video display memory. In the case where the number of the memory device 4 is extremely large, they may be divided into a plurality of banks and a corresponding responding number of tamper detection circuits may be provided in a one-to-one correspondence to the plurality of banks, whereby the detection speed can be increased.

There are cases where no detecting device is present in a particular address or the detecting device in a certain address is inoperative. In such cases, it is possible not to carry out the tamper detection for that nonexistent or inoperative portion. If there are a considerable number of addresses which are not subjected to a tamper detection, a non-examination bit map may be employed on which the addresses are indicated which are not subjected to a tamper detection. The non-examination bit map is constituted with a ROM. After the manufacture of the tamper resistant module and before the shipment thereof, a search is conducted to find out any absence of the detecting device or the malfunction of the detecting device, whereupon the respective data is written in the ROM.

The device protected by the tamper resistant module shown in FIG. 20 can communicate with an external station. Further, an address holding register may be provided to store the address outputted from the address generating circuit 10 when the read data discriminating circuit 11 detects a tampering for utilizing the stored data in the subsequently performed examination. A time holding register may be provided to store the output from a real time clock when the read data discriminating circuit 11 detects a tampering, for use in the subsequent examination.

Upon measuring the power supply voltage or an ambient temperature the circuit can be modified to detect a tampering if there is a significant change in the power supply voltage or in the ambient temperature.

Although the present invention has been described with reference to specific embodiments, a variety of changes and modifications may be made without departing from the scope and spirit of the invention. For example, although in the above described embodiments, the detecting memory devices are provided externally of the module in which the confidential data is contained and the tamper detection is performed through the detection of the storing contents in the detecting memory devices, the tamper detection can also be accomplished by the detection of the operations of digital devices other than the memory devices, e.g. shift register, logic devices using super conductive material.

What is claimed is:

1. A tamper resistant module for safeguarding stored information comprising: substrate means having an inner surface and an outer surface, memory means for storing confidential data, said memory means being confined by said inner surface of said substrate; means for preventing tampering, said tamper preventing means comprising a plurality of logical elements arranged on said outer surface of said substrate, said plurality of logical elements normally operating to provide an indication of a normal tamper-free condition, said plurality of logical elements being arranged in multiple layers on said outer substrate surface so that at least one logical element of said plurality of logical elements is rendered inoperative when a tampering attempt is applied to said outer surface of said substrate; and detecting means for detecting whether at least one of said plurality of logical elements has been rendered inoperative for indicating that a tampering has been applied to the outer surface of said substrate.

2. The tamper resistant module according to claim 1, further comprising erasing means for erasing said confidential data in response to an output signal from said detecting means indicating that tampering has been applied to the outer surface of said substrate.

3. The tamper resistant module according to claim 1, wherein said of said plurality of logical elements forms a memory device.

4. The tamper resistant module according to claim 1, wherein said plurality of logical elements are provided on the entire outer surface of said substrate.

5. The tamper resistant module according to claim 1, wherein said plurality of logical elements are provided on a part of the outer surface of said substrate.

6. The tamper resistant module according to claim 1, wherein said multiple layers comprise at least two layers of logical elements arranged so that logical elements in one layer are staggered relative to logical elements in the other layer, whereby logical elements of one layer fit into spaces between logical elements of the other layer and vice versa.

7. The tamper resistant module according to claim 6, wherein said logical elements are arranged in a checkerboard pattern in each layer.

* * * * *